United States Patent Office 3,220,121
Patented Nov. 30, 1965

3,220,121
GROUND-BASED FLIGHT TRAINING OR
SIMULATING APPARATUS
Albert Ernest Cutler, Barnet, England, assignor to
Communications Patents Limited
Filed May 20, 1963, Ser. No. 281,646
Claims priority, application Great Britain, July 8, 1962,
22,241/62
11 Claims. (Cl. 35—12)

The invention relates to ground based flight training or simulating apparatus in which the forces experienced by the pilot operating the flying controls vary according to the different conditions of the simulated flight.

In flight training or flight simulating apparatus, controls and instruments are provided which are representative of the controls and instruments of an aircraft, and a relationship is established between the controls and the instruments of the training or simulating apparatus usually by a computing device, so that operation of the controls of the training or simulating apparatus will cause the instruments thereof to indicate appropriate flight conditions. It is customary in the design of an aircraft to provide for a system of natural or artificial forces to oppose the pilot in his attempts to displace the controls, the nature and magnitude of the effects produced by the controls being selected to provide sensitivity of control for limited manoeuvres whilst at the same time restricting in the interests of safety the total effect which may be obtained. The present invention relates particularly to apparatus for loading the controls of the flight training or simulating apparatus so as to reproduce the forces operating on the controls under equivalent conditions in the aircraft.

It has been recognised for some time that the fidelity of feel of the controls in a flight training or simulating apparatus has a significant effect, not only on the ability of pilots to carry out precise manoeuvres but on their psychological attitude to the training apparatus and therefore the value of the training obtained thereby. The forces on the controls of an aircraft should be reproduced faithfully, not only for fixed control positions but also as they vary during the movement of the controls. During the movement of the controls of an aircraft, additional forces act on the controls, which forces are related, for example, to the dynamic characteristics of the control member movement, the control surfaces, the control surface actuator systems, and the artificial control force generators.

Many modern aircraft retain a degree of mechanical coupling between the control surfaces and the controls so that during flight when rough air is encountered, particularly of the type known as cobblestones, impulsive forces are transmitted to the control column. These impulsive forces may contain frequency components over a wide range, for example, from very low frequencies to the lower audio range.

Other aircraft control systems are powered by boosters of limited power so that at high airspeeds the booster torque is not sufficient to overcome the aerodynamic reaction and snubbing takes place due to mechanical interference. There are other aircraft control systems in which mechanical limits are applied to the travel of the controls, either continuously or at discrete airspeeds or Mach numbers by means of stops or snubbers. If the controls are brought up sharply against these stops or snubbers the forces required to displace the controls would increase discontinuously but for the elasticity of the control mechanism which causes instead a considerable gradient in the forces required. The fact that these effects cause the higher frequencies normally found in mechanism is evident from the audible knock which often results from the use of snubbers or stops.

Some aircraft control systems, either as a result of their design, or otherwise, possess dead zones or abrupt changes or slope in their control characteristics. The most common effect of this kind is associated with the centring of the controls, a small break-out force being required before any of the controls will move. Another common effect producing a similar result is back-lash in the mechanism of the controls which causes a small amount of lost motion at each reversal of the direction of movement of the controls. When the controls are taken rapidly through such zones, the forces acting thereon suffer a discontinuity which gives rise to knocks.

In order to simulate these effects on the operation of the aircraft controls with sufficient realism it is necessary that the transient response of the control loading system of a flight simulating apparatus should be very good, which requires that the frequency response of an electrical control loading system should extend smoothly from D.C. at least to the lower audio frequencies.

A principal object of the present invention is to provide means whereby the steady state and transient force effects on the controls in a simulated control loading system are made more faithful reproductions of their counterparts in the aircraft which the simulating apparatus simulates.

According to one aspect of the present invention, there is provided a flight training or simulating apparatus for simulating a specific aircraft type, including a control member which is operable manually, computing means for determining a first electrical quantity representing the force required to load the control member, first actuator means adapted to apply force to the control member and responsive to said first electrical quantity, an output force sensing device the output of which is a second electrical quantity representing the magnitude of the force applied by the first actuator means to the control, electrically connected in such a way that the operation of the first actuator means is controlled by a quantity representing the difference between the first and the second electrical quantities, and second actuator means, of the type which has output force substantially proportional to the magnitude of an electrical quantity applied to its input, also adapted to apply force to the control member and responsive to inputs including the said quantity representing the difference, whereby the combined force on the control member varies in simulation of the steady state and transient forces characteristics of the aircraft.

According to another aspect of the invention there is provided flight training or simulating apparatus for simulating a specific aircraft type, including a manually operable control member, computing means for determining an electrical quantity representing the force required to load the control member, a first and a second electrical circuit, the first electrical circuit being responsive to low frequency changes of the electrical quantity, the second electrical circuit being responsive to relatively higher frequency changes of the electrical quantity, a first and a second actuator means each adapted to apply force to the control members and responsive to the output of the first and the second electrical circuits respectively, whereby the static and transient forces acting on a control member of the simulated aircraft are faithfully reproduced.

In order that the invention will be more fully understood and readily carried into effect the following description is given with reference to the accompanying drawings, in which.

Figure 1:
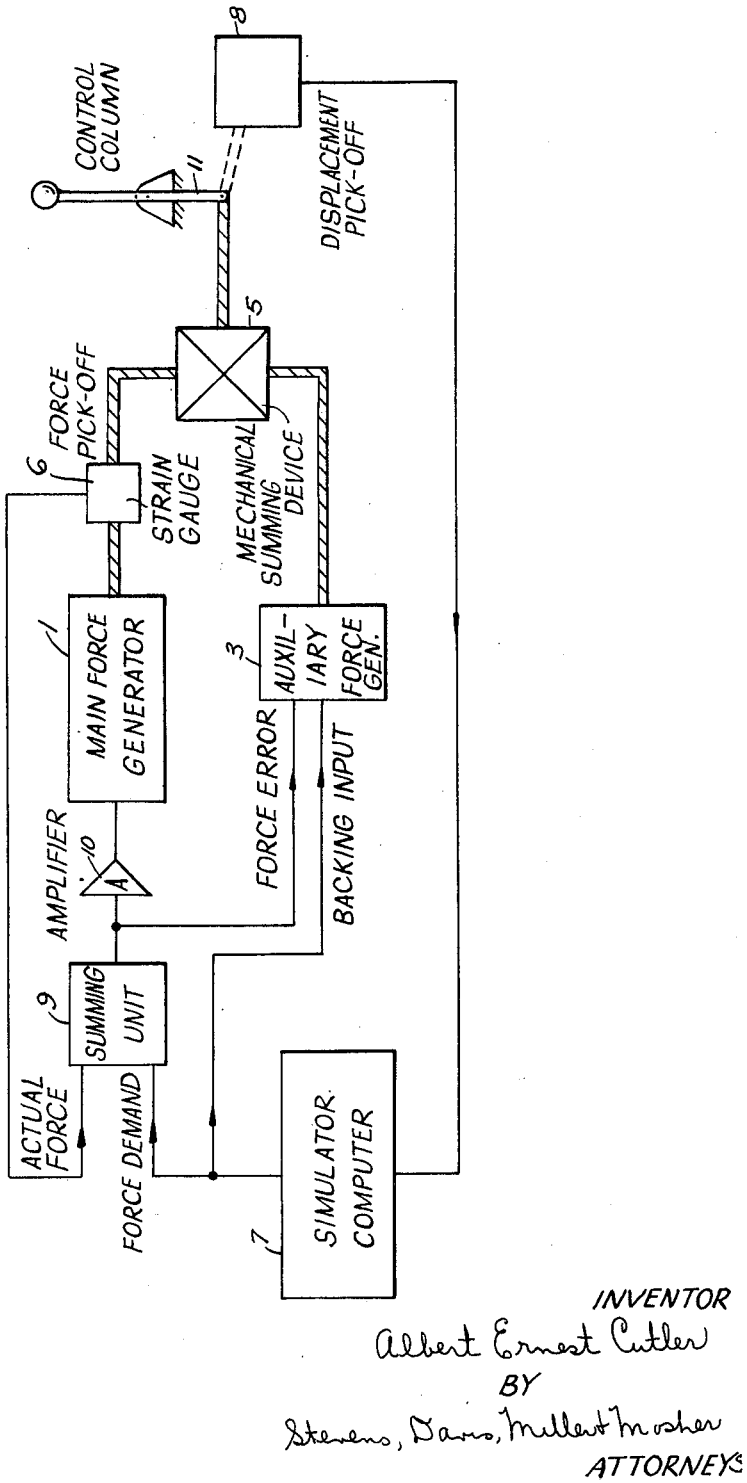
FIG. 1 is a block diagram of a control loading system for a flight training or simulating apparatus in which an auxiliary force generator is responsive to the error of a main force generator.

Referring to FIG. 1 a control column is shown representing a control of the aircraft being simulated. The control column is movable to operate pick-offs, not shown, connected to a computer where the aerodynamic performance of the simulated aircraft is reproduced and the consequent indications fed to the instruments of the pilot. An example of a computer of this kind is described in detail in a paper entitled "Flight Simulators" by G. B. Ringham and A. E. Cutler, published in the Journal of the Royal Aeronautical Society, vol. 58, No. 519, March 1954. During the simulation of the aircraft performance, forces are applied to the control column by a main force generator and an auxiliary force generator through a mechanical summing device. Conveniently, the main force generator 1 is an hydraulic ram fed with fluid by way of an electrically operated valve 2 and the auxiliary force generator 3 is a low inertia electric motor 3, mechanically coupled to a speed reduction gear 4, the output shaft of which provides the force output. The mechanical summing device 5 comprises, for example, an arrangement of mechanical links by which the output members of the force generators are coupled to the control column, so that the forces are summed in the desired relationship.

An example of a force generator in which the force output is provided by an hydraulic ram is described in British Patent No. 932,684. Mechanical summing devices of various kinds are described in "Analogue Methods in Computation and Simulation" by W. W. Soroka, chapter 1, published by McGraw Hill Publishing Co. Ltd. (1954). The accuracy requirements of good simulation of the forces acting on the controls of the simulated aircraft are such that they are difficult to achieve using an open loop system for forces applied to the control column in the simulating apparatus, that is a system without feedback from the output of the force generator to linearise the performance. In various known types of flight simulating apparatus when the requirements for stability under the wide range of loading conditions to which the equipment is subjected by the pilot have been met, the frequency response of the single force generator applying forces to a control column is not adequate and certain of the effects of the forces acting on the controls of the simulated aircraft are not fully reproduced.

Returning to FIG. 1, the main force generator is linearised by a force pick-off 6 included in an output drive member thereof. The force pick-off 6 may be a strain gauge of the kind described in "Wind-Tunnel Testing" by Alan Pope, page 149, published by John Wiley & Sons, Inc. New York (1954). The demanded force is determined in the computer 7, from the control column displacement, airspeed and various other factors, some of which have been mentioned above. A signal corresponding to the control column displacement, provided by a displacement pick-off 8, and signals corresponding to the other factors are combined in the computer 7, in a manner similar to that described in British Patent No. 958,326, and in applicant's copending United States patent application Serial No. 281,526, filed May 20, 1963.

An electrical signal from the computer 7, representing the demanded force, and an electrical signal from the force pick-off 6, in the output drive member of the main force generator 1, is fed to a summing unit 9, in which the two signals are combined, for example, by way of summing resistors in a conventional manner. The difference between the two signals fed to the summing unit 9 is used to operate the main force generator 1 through an amplifier 10.

The computer 7 produces an output signal when the control column 11 is displaced by the pilot in carrying out a desired manoeuvre. The force signal produced by the force pick-off 6 in response to the force exerted by the pilot in displacing the control column and the output signal produced by the computer 7 are of relatively opposite phase relationship. When the two signals have the same magnitude the force necessary to displace the control column is equal to the force computed by the required force computer.

This method of operating the main force generator provides large low frequency gain so that the steady forces acting on the controls of the simulated aircraft are substantially accurately simulated. When the demanded force varies with relatively higher frequencies, due to the mass and compliance of parts of the main force generator, the main force generator is not able to generate forces according to the demand, and an error voltage representing the force error appears at the input of the amplifier 10.

The auxiliary force generator, responsive to the relatively higher frequencies of change of the demanded force, is fed with the output of the summing unit 9 and amplifies the force error with the same gain referred the control column as the main force generator. The output of the auxiliary force generator 3 is added to the output force of the main force generator 1, in the mechanical summing device 5, so that within the frequency range of the auxiliary force generator, the forces to be simulated are more fully reproduced.

In order to prevent the main force generator driving back the auxiliary force generator at low frequencies of change of the demanded force, a backing input from the computer 7 is applied to the auxiliary force generator. The magnitude of the backing input signal is such that the resultant force generated by the auxiliary force generator balances the force applied to its output by way of the mechanical summing device.

Figure 2:
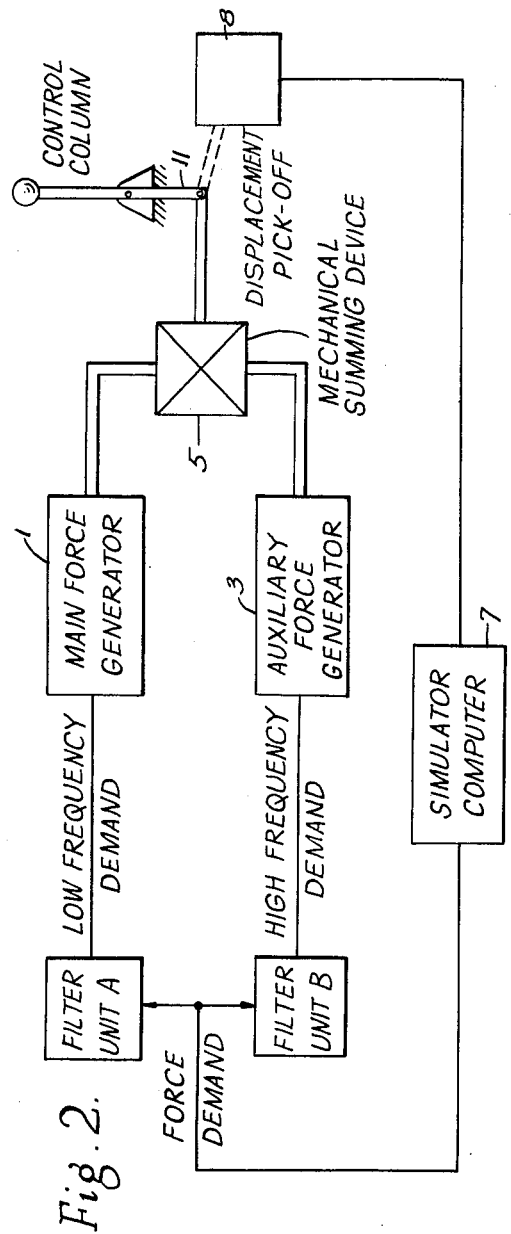
FIG. 2 is a block diagram of the control loading system in which the two force generators are fed through filter circuits.

FIG. 2 shows a variation from the arrangement of FIG. 1. As it is known at which frequency of change of the demanded force the main force generator begins to cut off, it may be convenient to divide the frequency spectrum of the demanded force so that the lower frequencies, which the main force generator is known to handle satisfactorily, are separated from the demanded force signal by a filter unit A, the remainder of the demanded force signal being routed to the input of the auxiliary force generator through a filter unit B. In some cases the natural frequency response of the main force generator 1, determined by the mass and compliance of parts of the generator, will be an adequate filter in which case filter unit A may be omitted. The filter unit B is disposed so as to filter the signal applied to the auxiliary force generator. The filter unit B may also be designed to pass a proportion of the lower frequency components to provide the backing input for the auxiliary force generator. The filters A and B may be of the kind described in detail in "Radio Engineers Handbook," by F. E. Terman, sect. 3, paras. 18–31, published by McGraw Hill Book Co. Inc., New York and London (1943).

Figure 3:
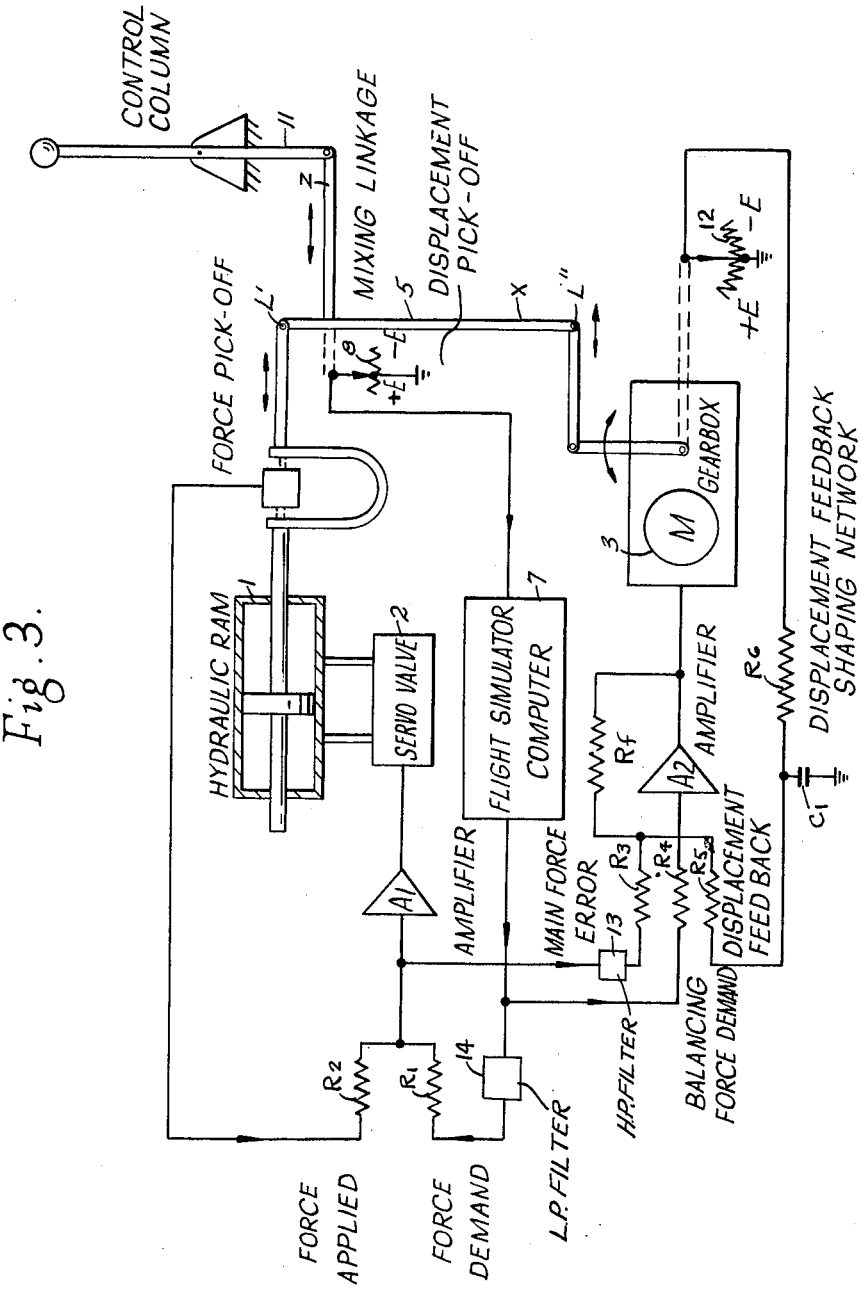
FIG. 3 is a schematic diagram of the control loading system illustrating some of the equipment and circuits used.

FIG. 3 shows in more detail a typical arrangement based on the system of FIG. 1. The main force generator comprises a hydraulic ram fed from an electrically operated servo valve 2. The demanded force signal is computed in the computer 7, from the displacement signal provided by a potentiometer 8, and from other signals affecting the force on the control column 11. The force pick-off 6 provides an electrical signal corresponding to the force applied to the control by the hydraulic ram 1. In this example, the pick-off 6 is a U-beam mechanical coupling, incorporating a strain gauge and adapted to provide an output voltage which varies linearly with the distortion of the U-beam. The demanded force and the applied force signals are fed by way of summing resistors $R_1$ and $R_2$ respectively to amplifier $A_1$, the output of which operates the mechanism of a servo valve 2, which controls the flow of fluid to the hydraulic ram 1. The motor of the auxiliary force generator 3 is fed with current from an electronic power amplifier $A_2$, to which input signals are fed by way of summing resistors $R_3$, $R_4$, and $R_5$, and which has feedback provided by way of a resistor $R_f$. The force error and the backing input signals are fed to resistors $R_3$ and $R_4$ respectively. A displacement feedback signal, the purpose of which will be explained later in the specification, is provided by a potentiometer 12, mechanically coupled to the output member of the gear box 4, and is fed to the amplifier $A_2$, by way of resistor $R_5$.

The amplifier $A_2$ and motor M combination is chosen so that the ratio of the output torque to the input voltage thereof is approximately constant. The proportion of high frequencies in the demanded force signals is relatively small and the auxiliary force generator may have smaller power than the main force generator.

The forces generated by the main force generator and the auxiliary force generator are added using a mixing linkage comprising movable links X, Y, and Z. One end L' of the link X is coupled to the output member of the hydraulic ram 1 and the other end L" is coupled to the output member of the auxiliary force generator 3 by way of the link Y. Arrows indicate the general direction of movement of the output members of the force generators 1 and 3 and of the link Z by which the control column 11 is coupled to the mixing linkage.

Any suitable adapted mechanical differential would serve in place of the mixing linkage. The mixing linkage is proportioned so that the maximum force output from the main force generator can just be held by a balancing force available from the auxiliary force generator. At low frequencies, when both force generators can respond to the demanded force signal, the gain of the amplifier $A_2$ is carefully adjusted so that a link X of the mixing linkage in the "control free" condition is moved more or less equally by the two forces generated and hence remains parallel to its normal position. A weak displacement feedback signal from the potentiometer 12, fed to the amplifier $A_2$, by way of summing resistor $R_5$, ensures that a small residual unbalance of the forces generated does not drive the output member of the auxiliary force generator 3 against its stops.

At low frequencies of change of the demanded force, when the track of the link X of the mixing linkage is such that the link X remains substantially parallel to its normal position, the force exerted on the control column is equal to the force applied by the hydraulic ram 1 multiplied by the factor $K_m$ and to the force applied by the auxiliary force generator 3 multiplied by the factor $K_a$, the factors $K_m$ and $K_a$ being determined by geometry of the mixing linkage. Conveniently, the factor $K_m$ may be slightly greater than unity and the factor $K_a$ may exceed four. At high frequencies of change of the demanded force, the main force falls off and the gain of the amplifier $A_2$ to the error input is such that the force on the control column is restored.

In the absence of auxiliary force generator displacement feedback, with the input signals to the amplifier $A_2$ balanced, the link X is free to adopt any angle with respect to the link Y, since neither force generator output member is displacement sensitive. This is undesirable and a signal from the pick-off 12 is therefore provided for the centering of the auxiliary force generator and thereby, through the force pick-off 6 centering of the main force generator. At higher frequencies, the hydraulic system is virtually irreversible and the link X of the mixing linkage pivots about its upper end L'. As the force acting on the control column is now governed by the auxiliary force generator 3, it is desirable to remove or reduce the displacement feedback. This may be accomplished by a filter circuit comprising, for example, a resistor $R_6$, and a capacitor $C_1$, connected between the pick-off 12 and the resistor $R_5$.

The system shown in FIG. 2 may be applied using the apparatus of FIG. 3 as shown in FIG. 4, except that the force error signal fed to resistor $R_3$ is replaced by a force demand signal obtained from the computer 7 and fed to the resistor $R_3$ by way of the high pass filter 13. The amplitude/frequency characteristics of the filter 13 is the complement of the amplitude/frequency characteristics of either the output of the main force generator or the amplitude/frequency characteristic of the low pass filter 14 connected to the computer 7 and the input resistor $R_1$, if the low pass filter is used. The backing input is fed from the computer 7 to the resistor $R_4$ in the normal way.

Although the force generators have been described as electro-hydraulic and electric, other kinds of force generators may be used, for example a pair of hydraulic force feed-back systems if desired, providing that the frequency response characteristcis of the single main force generator are improved by adding the auxiliary force generator in the manner described.

The system in FIG. 3 is drawn for D.C. control circuits but the system will work equally well with A.C. pick-offs providing that suitable phase sensitive rectifiers are included where appropriate.

The frequency shaping networks shown are not intended to be specific but would be varied according to the nature of the problem. It is also possible that other networks may be included in the interests of stability, etc.

Known means may be provided to feed to the computing means, quantities representative, for example, of one or more of the following conditions affecting the operation of the control column: the operation of an auxiliary control member, the relative air-stream angle for the aircraft simulated, the dynamics of the aircraft simulated, the Mach number of the simulated aircraft, the effect of kinetic friction on the control member of the simulated aircraft, the effect of static friction on the control member of the simulated aircraft, the effect of propeller wash on the operation of the control member of the simulated aircraft, the vertical or pitching acceleration of the simulated aircraft.

What I claim is:

1. A flight training or simulating apparatus for simulating a specific aircraft type, including a control member which is operable manually, computing means for determining a first electrical quantity representing the force required to load the control member, first actuator means adapted to apply force to the control member and responsive to said first electrical quantity below a predetermined frequency, an output force sensing device the output of which is a second electrical quantity representing the magnitude of the force applied by the first actuator means to the control, said first actuator means and said output sensing device being electrically connected in such a way that the operation of the first actuator means is controlled by a quantity representing the difference between the first and the second electrical quantities, second actuator means for producing a force proportional to the magnitude of an electrical quantity above said predetermined frequency applied to its input and responsive to said quantity representing the difference between the first and second electrical quantities, mixing linkage means responsive to the output forces of said first and second actuator means for loading said control member, and feedback means connected to said computing means and responsive to the displacement of said control member for providing a closed loop system whereby the combined force on the control member varies in simulation of the steady state and transient forces characteristics of the aircraft.

2. An apparatus according to claim 1 in which the first actuator means is the main force generator comprising a hydraulic ram fed from an electrically operated servo valve.

3. An apparatus according to claim 1 in which the second actuator means is an auxiliary force generator comprising a low inertia servo motor and a gear box.

4. An apparatus according to claim 1 in which the second actuator means is an auxiliary force generator comprising a moving coil electrodynamic motor.

5. An apparatus according to claim 1 in which the forces applied by said first and second actuator means to said control member are transmitted through a mechanical summing device, comprising a differential gear.

6. An apparatus according to claim 5 in which a backing input is applied to said second actuator means by said computing means to prevent the first actuator means from driving back said second actuator means.

7. An apparatus according to claim 1 in which said output force sensing device comprises an electrical strain gauge.

8. An apparatus according to claim 1 in which said input to the first actuator means is electrical quantities passed through an amplifier.

9. An apparatus according to claim 1 in which the input to the second actuator means is electrical quantities passed through an amplifier with an adjustable power gain.

10. An apparatus according to claim 1 in which the input to said computing means is a quantity representing the position of said control member obtained from the output of a displacement transducer.

11. An apparatus according to claim 10, in which the input to said computing means includes, correction quantities representative of at least one of the following conditions affecting the operation of the control member: the operation of an auxiliary control member, the relative air-stream angle for the aircraft simulated, the dynamics of the aircraft simulated, the Mach number of the simulated aircraft, the altitude of the simulated aircraft, the effect of kinetic friction on the control member of the simulated aircraft, the effect of static friction on the control member of the simulated aircraft, the effect of propeller wash on the operation of the control member of the simulated aircraft, the vertical or pitching acceleration of the simulated aircraft.

References Cited by the Examiner
UNITED STATES PATENTS

| | | | |
|---|---|---|---|
| 2,627,675 | 2/1953 | Kittredge | 35—12 |
| 2,804,698 | 9/1957 | Grandmont | 32—12 |
| 2,808,659 | 10/1957 | Dehmel | 35—12 |
| 2,851,795 | 9/1958 | Sherman | 35—12 |
| 2,860,423 | 11/1958 | Dehmel | 35—12 |
| 2,909,852 | 10/1959 | Stern et al. | 35—12 |
| 3,007,258 | 11/1961 | Hemstreet et al. | 35—12 |
| 3,063,160 | 11/1962 | Hemstreet | 35—12 |
| 3,026,629 | 3/1962 | Peck et al. | 35—12 |

JEROME SCHNALL, *Primary Examiner.*
LAWRENCE CHARLES, *Examiner.*